US 6,688,415 B2

(12) United States Patent
Atkinson et al.

(10) Patent No.: US 6,688,415 B2
(45) Date of Patent: Feb. 10, 2004

(54) STABILITY CONTROL THROTTLE COMPENSATION ON VEHICLES WITH PASSIVE ALL WHEEL DRIVE SYSTEMS

(75) Inventors: Nancy Michelle Atkinson, Brownstown Township, MI (US); Syun Kyung Lee, Ann Arbor, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/063,051

(22) Filed: Mar. 14, 2002

(65) Prior Publication Data
US 2003/0173129 A1 Sep. 18, 2003

(51) Int. Cl.[7] .............................................. B60K 23/08
(52) U.S. Cl. .................... 180/233; 180/197; 701/69; 701/70
(58) Field of Search ............................... 180/197, 233, 180/247, 248; 701/69, 70

(56) References Cited

U.S. PATENT DOCUMENTS

| 5,448,478 | A | * | 9/1995 | Eto ............................... 701/69 |
| 5,605,201 | A | * | 2/1997 | McGinn et al. ............. 180/233 |
| 5,752,211 | A | * | 5/1998 | Takasaki et al. .............. 701/69 |
| 5,954,778 | A | * | 9/1999 | Rodrigues et al. ............ 701/69 |
| 6,360,156 | B1 | * | 3/2002 | Morganroth et al. .......... 701/69 |

* cited by examiner

Primary Examiner—Lesley D. Morris
Assistant Examiner—L. Lum
(74) Attorney, Agent, or Firm—Gregory P. Brown

(57) ABSTRACT

A method and apparatus for overcoming negative torque transfer in a passive coupling (43) in a vehicle (10) having all wheel drive. The vehicle (10) includes a front driveshaft (22), a rear driveshaft (26), with the passive coupling (43) connecting the front driveshaft (22) and the rear driveshaft (26). The vehicle (10) also includes a transmission (30) operatively connected to the passive coupling (43). The method includes determining negative torque transfer in the passive coupling (43) and requesting the vehicle (10) to increase transmission output equal to the negative torque transfer.

20 Claims, 2 Drawing Sheets

STABILITY CONTROL THROTTLE COMPENSATION ON VEHICLES WITH PASSIVE ALL WHEEL DRIVE SYSTEMS

BACKGROUND OF INVENTION

The present invention relates to a vehicle, and in particular to an all wheel drive vehicle having a passive coupling.

Vehicles currently have stability control systems that prevent lateral instability of the vehicle. Heretofore, stability control systems have included a brake based control system similar to an anti-lock brake control system. The brake based stability control system makes a stability correction by applying one or more of the brakes independent of a driver of the vehicle during an oversteer or understeer condition. Therefore, the stability control system will drive one or more of the wheels to deep slip, thereby generating a counter yaw on the vehicle to counter the oversteer or understeer condition. However, when the vehicle is an all wheel drive vehicle having a passive coupling between a primary driveshaft and a secondary driveshaft, the effectiveness of the stability control correction may be reduced by a negative torque transferred from one driveshaft to the other driveshaft due to the inability of the vehicle to completely disconnect the secondary driveshaft from the primary driveshaft.

Accordingly, an apparatus solving the aforementioned disadvantages and having the aforementioned advantages is desired.

SUMMARY OF INVENTION

One aspect of the present invention is to provide a method for overcoming negative torque transfer in a passive coupling in a vehicle having all wheel drive. The vehicle includes a front driveshaft and a rear driveshaft, with the passive coupling connecting the front driveshaft and the rear driveshaft. The vehicle also includes a transmission operatively connected to the passive coupling. The method includes determining negative torque transfer in the passive coupling and requesting the vehicle to increase transmission output equal to the negative torque transfer.

Another aspect of the present invention is to provide a vehicle system for overcoming negative torque transfer in a vehicle having all wheel drive. The vehicle system includes a front driveshaft, a rear driveshaft, a passive coupling connecting the front driveshaft and the rear driveshaft, a passive torque control system, and a transmission operatively connected to the passive coupling. The passive torque control system calculates a front driveshaft rotational speed of the front driveshaft and a rear driveshaft rotational speed of the rear driveshaft, and calculates a speed difference across the passive coupling by subtracting the front driveshaft rotational speed from the rear driveshaft rotational speed. The passive torque control system also determines negative torque transfer in the passive coupling corresponding to the speed difference and requests an output from the transmission equal to the negative torque transfer.

Yet another aspect of the present invention is to provide a method of overcoming negative viscous torque transfer in a passive coupling in a vehicle having all wheel drive. The vehicle includes a front axle having a first front wheel and a second front wheel, a front driveshaft connected to the front axle, a rear axle having a first rear wheel and a second rear wheel, and a rear driveshaft connected to the rear axle. The vehicle also has the passive viscous coupling connecting the front driveshaft and the rear driveshaft. The vehicle further includes a transmission operatively connected to the passive coupling. The method comprises measuring a first front rotational speed of the first front wheel, measuring a second front rotational speed of the second front wheel, measuring a first rear rotational speed of the first rear wheel and measuring a second rear rotational speed of the second rear wheel. The method also comprises calculating a front driveshaft rotational speed using the formula $((f_1+f_2)/2)*r_f$, wherein $f_1$ equals the first front rotational speed, $f_2$ equals the second front rotational speed, and $r_f$ equals the axle ratio of the front driveshaft over the first front wheel or the second front wheel. The method further comprises calculating a rear driveshaft rotational speed using the formula $((r_1+r_2)/2)*r_r$, wherein $r_1$ equals the first rear rotational speed, $r_2$ equals the second rear rotational speed, and $r_f$ equals the axle ratio of the rear driveshaft over the first rear wheel or the second rear wheel. The method further includes the step of calculating a speed difference across the passive viscous coupling by subtracting the front driveshaft rotational speed from the rear driveshaft rotational speed. The method also includes the steps of determining negative viscous torque transfer in the passive coupling corresponding to the speed difference and requesting the vehicle to increase transmission output equal to the negative viscous torque transfer.

Accordingly, the vehicle system provides a torque output from the engine and the transmission that will offset the negative torque transfer from a stability maneuver to allow the stability maneuver to effectively stabilize the vehicle. The vehicle system is easy to implement, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
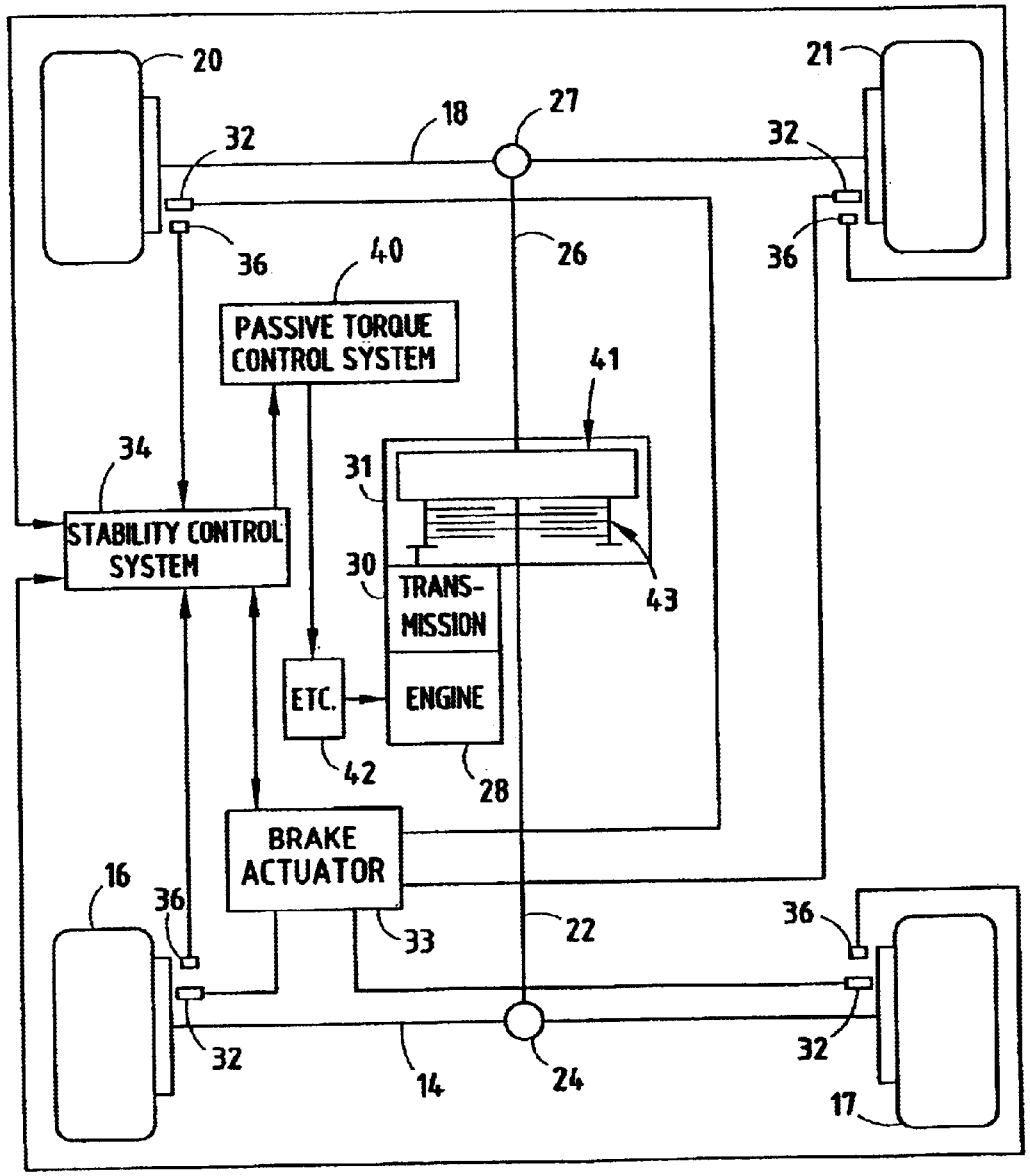
FIG. 1 is a block diagram illustrating a vehicle embodying a torque loss system according to the present invention.

Referring to FIG. 1, reference number 10 generally designates a vehicle embodying the present invention. The vehicle 10 includes a front axle 14 having a first front wheel 16 and a second front wheel 17. The vehicle 10 also includes a rear axle 18 having a first rear wheel 20 and a second rear wheel 21. The front axle 14 is connected to a front driveshaft 22 through a front open differential 24 and the rear axle 18 is connected to a rear driveshaft 26 through a rear open differential 27. An engine 28 and a transmission 30 are coupled to a transfer case 31. The transfer case 31 includes a center differential 41 for transferring a driving input from the transmission 30 to the front driveshaft 22 and the rear driveshaft 26. The transfer case 31 also includes a passive coupling 43 directly coupling the front driveshaft 22 to the rear driveshaft 26. The passive coupling 43 is a permanent connection between the front driveshaft 22 and the rear driveshaft 26. Preferably, the passive coupling 43 is a passive viscous coupling, although it is contemplated that other passive couplings can be used with the present invention. The vehicle 10 is therefore an all wheel drive (AWD) vehicle. The vehicle 10 further includes a brake actuator 33 communicating with a brake 32 adjacent the first front wheel 16, the second front wheel 17, the first rear wheel 20 and the second rear wheel 21. All of the above features of the vehicle 10 are well known to those skilled in the art.

In the illustrated example, the vehicle 10 preferably includes a brake based stability control system 34. As is well known to those skilled in the art, the brake based stability control system 34 determines that an oversteer or understeer condition of the vehicle is present through wheel-speed sensors (38), brake-pressure sensors (not shown), a steering-wheel sensor (not shown), a yaw-rate sensor (not shown) and a lateral acceleration sensor (not shown). The stability control system 34 makes a stability maneuver using pressure modulation and engine management to influence the tractive force and braking force of one or more of the wheels 16, 17, 20 and 21 to drive the one or more of the wheels 16, 17, 20 and 21 into deep slip independent of a driver of the vehicle 10 during the oversteer or understeer condition, thereby generating a counter yaw to counter the oversteer or understeer condition. The all wheel drive vehicle 10, however, can potentially reduce the effectiveness of the stability maneuver due to the inability of the vehicle 10 to completely disconnect the front driveshaft 22 from the rear driveshaft 26.

The effectiveness of the stability maneuver can be reduced if either the front driveshaft 22 or the rear driveshaft 26 transfers torque to the other driveshaft during the stability maneuver. During the stability maneuver, the front driveshaft 22 and the rear driveshaft 26 can begin to rotate at different speeds because of braking of one of the wheels connected to the front driveshaft 22 or the rear driveshaft 26 through the front axle 14 or the rear axle 18, respectively. Because the front driveshaft 22 and the rear driveshaft 26 are connected by the passive coupling 43, the speed difference between the front driveshaft 22 and the rear driveshaft 26 in the transfer case 31 causes a positive torque application on the driveshaft 22 or 26 with the associated braked wheel (via the axle 14 or 18) and a negative torque application or transfer (larger braking torque) on the opposite driveshaft 22 or 26. The positive torque application on one of the axles 14 or 18 will cause the wheel opposite to the braked wheel to rotate at a faster speed and apply more torque. The negative torque application or transfer on the opposite axle 14 or 18 causes the wheels associated with the opposite axle 14 or 18 to rotate at a slower speed and apply less torque. In the illustrated example, the negative torque transfer can be a negative viscous torque transfer if the passive viscous coupling is employed in the vehicle 10.

In the illustrated example, the vehicle 10 includes a passive torque control system 40 for overcoming the negative torque transfer. The passive torque control system 40 comprises a control unit communicating with the stability control system 34. The passive torque control system 40 can be a separate control system as shown in FIG. 1 or can be incorporated into the stability control system 34. The passive torque control system 40 also communicates with an electronic throttle control (ETC) 42 that moves a throttle valve of the engine 28 in correlation to an acceleration pedal in the vehicle being pressed. The electronic throttle control 42 and its interaction with the engine 28 and the acceleration pedal are well known to those skilled in the art. The passive torque control system 40 directs the electronic throttle control 42 to increase transmission output to overcome the negative torque transfer in the passive coupling 43. By increasing the transmission output, the negative torque transfer in the passive coupling 43 can be overcome to nullify the negative torque transfer and to provide for an effective stability maneuver.

Figure 2:
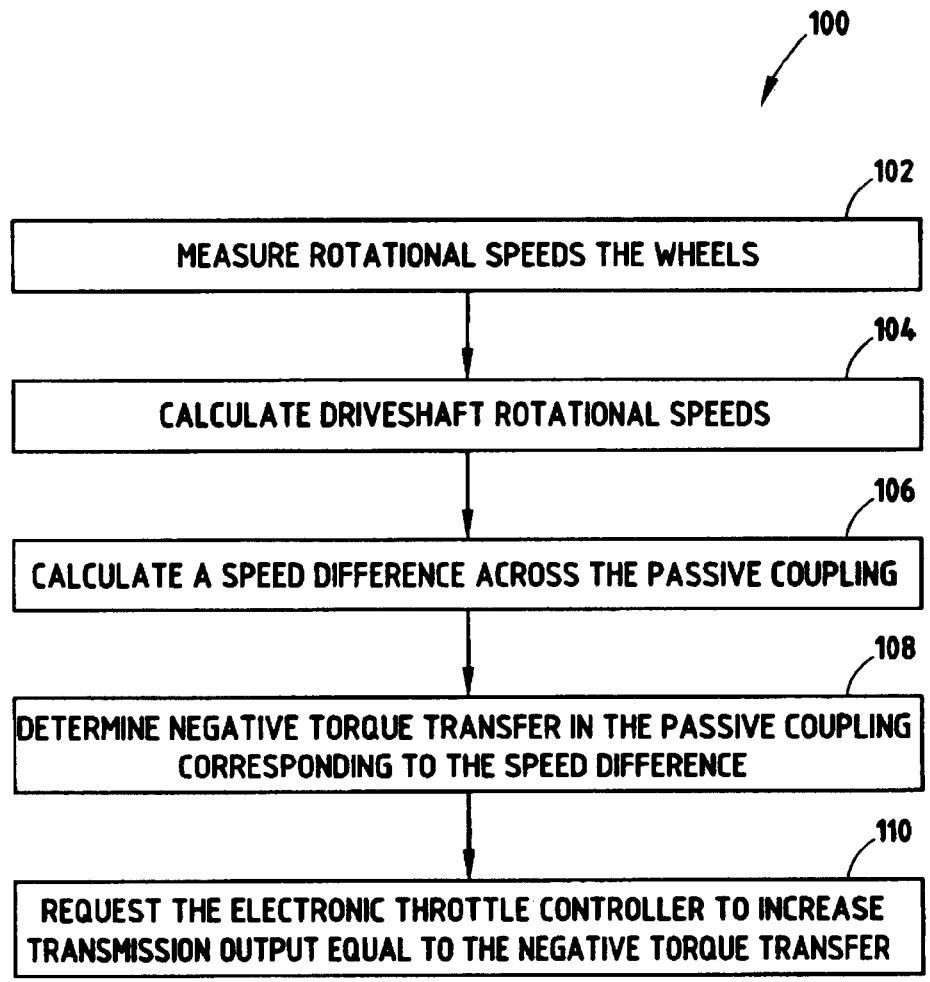
FIG. 2 discloses a block diagram illustrating a methodology for overcoming negative torque transfer in a passive coupling in a vehicle having all wheel drive.

The illustrated passive torque control system 40 of the present invention overcomes negative torque transfer in the passive coupling 43 in the vehicle 10 having all wheel drive. Referring to FIG. 2, a method 100 of overcoming negative torque transfer in the passive coupling 43 is shown. Beginning at step 102 of the method 100 of overcoming negative torque transfer, the rotational speeds of all of the wheels 16, 17, 20 and 21 are measured. Preferably, the stability control system 34 will measure the rotational speed of the wheels 16, 17, 20 and 21 with the sensors 32 and will transfer this information to the passive torque control system 40.

The passive torque control system 40 will then calculate the rotational speeds of the front driveshaft 22 and the rear driveshaft 26 at step 104. The front driveshaft rotational speed is calculated by measuring a first front rotational speed of the first front wheel 16 with one of the wheel speed sensors 32 and measuring a second front rotational speed of the second front wheel 17 with one of the wheel speed sensors 32. The front driveshaft rotational speed is then determined using the formula $((f_1+f_2)/2)*r_f$, wherein $f_1$ equals the first front rotational speed, $f_2$ equals the second front rotational speed, and $r_f$ equals a front axle ratio of the front driveshaft 22 over the front axle 14. The front axle ratio is the rotational speed of the front driveshaft 22 over the rotational speed of the front wheels 16 and/or 17. The rear driveshaft rotational speed is calculated by measuring a first rear rotational speed of the first rear wheel 20 with one of the wheel speed sensors 32 and measuring a second rear rotational speed of the second rear wheel 21 with one of the wheel speed sensors 32. The rear driveshaft rotational speed is then determined using the formula $((r_1+r_2)/2)*r_r$, wherein $r_1$ equals the first rear rotational speed, $r_2$ equals the second rear rotational speed, and $r_r$ equals the rear axle ratio of the rear driveshaft 26 over the rear axle 18. The rear axle ratio is the rotational speed of the rear driveshaft 26 over the rotational speed of the rear wheels 20 and/or 21.

The passive torque control system 40 is thereafter able to calculate a speed difference across the passive coupling 43 by subtracting the front driveshaft rotational speed from the rear driveshaft rotational speed at step 106. After the passive torque control system 40 has determined the speed difference across the passive coupling 43 at step 106, the passive torque control system 40 will determine the negative torque transfer in the passive coupling 43 corresponding to the speed difference at step 108. The negative torque transfer in the passive coupling 43 is preferably determined by a look-up table in the ROM of the passive torque control system 40 telling the negative torque transfer for a given speed difference across the passive coupling 43. The look-up table can be generated in laboratory conditions by measuring the relative speed of the front driveshaft 22 and the rear driveshaft 26 and the associated torque output of the driveshafts 22 and 26 at the speed difference between the driveshafts 22 and 26. In the illustrated embodiment, the negative torque transfer will be a viscous negative torque transfer when the passive viscous coupling is employed in the vehicle 10. The passive torque control system 40 will then request the electronic throttle control 42 to increase transmission output equal to the negative torque transfer at step 110. Preferably, the request to increase transmission output of step 110 only occurs during a stability maneuver of the stability control system 34 in response to the negative torque transfer produced by the stability maneuver of the stability control system 34. Although the electronic throttle control 42 is used to increase transmission output, it is contemplated that the transmission output can be increased in any manner. For example, a richer fuel mixture could be added to the engine, an actuator connected to the acceleration pedal could be activated to activate the acceleration pedal, etc. Consequently, the output from the transmission 30 to the transfer case 31 will be equal to the negative torque transfer and will provide a positive torque to the driveshaft not associated with the braked wheel that will nullify the effects of the negative torque transfer.

The stability control system 34 and/or the passive torque control system 40 may include a general-purpose microprocessor-based controller, and may include a commercially available off-the-shelf controller. The control systems preferably include a processor and memory for storing and processing software algorithms which processes inputs and provides output control signals.

It will be readily appreciated by those skilled in the art that modifications may be made to the invention without departing from the concepts disclosed herein. For example, it is contemplated that the front open differential 24 and the rear open differential 27 could be any type of differential known to those skilled in the art. The controllers can be interconnected via a service data bus of the vehicle or are hard-wired together. Furthermore, the controllers could be implemented in any of a number of microprocessor based controllers. While digital controllers are described herein, it should be appreciated that the controllers could alternatively be in analog circuitry. Such modifications are to be considered as included in the following claims, unless these claims by their language expressly state otherwise.

What is claimed is:

1. A method of overcoming negative torque transfer in a passive coupling in a vehicle having all wheel drive, the vehicle including a front driveshaft, a rear driveshaft, the passive coupling connecting the front driveshaft and the rear driveshaft, and a transmission operatively connected to the passive coupling, the method comprising:

determining negative torque transfer in the passive coupling; and requesting the vehicle to increase transmission output equal to the negative torque transfer.

2. The method of overcoming negative torque transfer of claim 1, wherein:

the step of determining negative torque transfer in the passive coupling includes:
determining a front driveshaft rotational speed;
determining a rear driveshaft rotational speed;
calculating a speed difference across the passive coupling by subtracting the front driveshaft rotational speed from the rear driveshaft rotational speed;
determining negative torque transfer in the passive coupling corresponding to the speed difference.

3. The method of overcoming negative torque transfer of claim 2, wherein:

the vehicle includes a front axle having a first front wheel and a second front wheel, the vehicle further including a rear axle having a first rear wheel and a second rear wheel, the front driveshaft being connected to the front axle, and the rear driveshaft being connected to the rear axle;

the step of determining the front driveshaft rotational speed includes measuring a first front rotational speed of the first front wheel and measuring a second front rotational speed of the second front wheel; and the step of determining the rear driveshaft rotational speed includes measuring a first rear rotational speed of the first rear wheel and measuring a second rear rotational speed of the second rear wheel.

4. The method of overcoming negative torque transfer of claim 3, wherein:

the step of determining the front driveshaft rotational speed includes calculating the front driveshaft rotational speed using the following formula:

$$((f_1+f_2)/2)*r_f$$

wherein $f_1$=the first front rotational speed, $f_2$=the second front rotational speed, and $r_f$=a front axle ratio of the front driveshaft over the first front wheel or the second front wheel; and the step of determining the rear driveshaft rotational speed includes calculating the rear driveshaft rotational speed using the following formula:

$$((r_1+r_2)/2)*r_r$$

wherein $r_1$=the first rear rotational speed, $r_2$=the second rear rotational speed, and $r_r$=a rear axle ratio of the rear driveshaft over the first rear wheel or the second rear wheel.

5. The method of overcoming negative torque transfer of claim 4, further including:

providing wheel speed sensors;

wherein the step of measuring the first front rotational speed of the first front wheel and measuring the second front rotational speed of the second front wheel includes measuring the first front rotational speed of the first front wheel with one of the wheel speed sensors and measuring the second front rotational speed of the second front wheel with one of the wheel speed sensors; and wherein the step of measuring the first rear rotational speed of the first rear wheel and measuring the second rear rotational speed of the second rear wheel includes measuring the first rear rotational speed of the first rear wheel with one of the wheel speed sensors and measuring the second rear rotational speed of the second rear wheel with one of the wheel speed sensors.

6. The method of overcoming negative torque transfer of claim 1, wherein:

the vehicle includes a stability control system; and further including the step of activating the stability control system;

wherein the step of requesting the vehicle to increase transmission output equal to the negative torque transfer only occurs in response to the step of activating the stability control system.

7. The method of overcoming negative torque transfer of claim 6, wherein:

the vehicle includes a front axle having a first front wheel and a second front wheel, the vehicle further including a rear axle having a first rear wheel and a second rear wheel, the front driveshaft being connected to the front axle, and the rear driveshaft being connected to the rear axle;

the stability control system includes wheel speed sensors;

the step of determining the front driveshaft rotational speed includes measuring a first front rotational speed of the first front wheel and measuring a second front rotational speed of the second front wheel with the wheel speed sensors; and the step of determining the rear driveshaft rotational speed includes measuring a first rear rotational speed of the first rear wheel and measuring a second rear rotational speed of the second rear wheel with the wheel speed sensors.

8. The method of overcoming negative torque transfer of claim 7, wherein:

the step of determining the front driveshaft rotational speed includes calculating the front driveshaft rotational speed using the following formula:

$$((f_1+f_2)/2)*r_f$$

wherein $f_1$=the first front rotational speed, $f_2$=the second front rotational speed, and $r_f$=a front axle ratio of the front driveshaft over the first front wheel or the second front wheel; and the step of determining the rear driveshaft rotational speed includes calculating the rear driveshaft rotational speed using the following formula:

$$((r_1+r_2)/2)*r_r$$

wherein $r_1$=the first rear rotational speed, $r_2$=the second rear rotational speed, and $r_r$=a rear axle ratio of the rear driveshaft over the first rear wheel or the second rear wheel.

9. The method of overcoming negative torque transfer of claim 1, wherein:

the passive coupling is a viscous coupling and the negative torque transfer is a viscous negative torque transfer.

10. A vehicle system for overcoming negative torque transfer in a vehicle having all wheel drive comprising:

a front driveshaft;

a rear driveshaft;

a passive coupling connecting the front driveshaft and the rear driveshaft;

a passive torque control system; and a transmission operatively connected to the passive coupling;

wherein the passive torque control system calculates a front driveshaft rotational speed of the front driveshaft and a rear driveshaft rotational speed of the rear driveshaft, calculates a speed difference across the passive coupling by subtracting the front driveshaft rotational speed from the rear driveshaft rotational speed, determines negative torque transfer in the passive coupling corresponding to the speed difference, and requests an output from the transmission equal to the negative torque transfer.

11. The vehicle system of claim 10, further including:

a front axle having a first front wheel and a second front wheel, the front driveshaft being connected to the front axle; and a rear axle having a first rear wheel and a second rear wheel, with the rear driveshaft being connected to the rear axle;

wherein the passive torque control system determines the front driveshaft rotational speed by measuring a first front rotational speed of the first front wheel and a second front rotational speed of the second front wheel, and determines the rear driveshaft rotational speed by measuring a first rear rotational speed of the first rear wheel and a second rear rotational speed of the second rear wheel.

12. The vehicle system of claim 11, wherein:

the passive torque control system determines the front driveshaft rotational speed using the following formula:

$$((f_1+f_2)/2)*r_f$$

wherein $f_1$=the first front rotational speed, $f_2$=the second front rotational speed, and $r_f$=a front axle ratio of the front driveshaft over the first front wheel or the second front wheel; and the passive torque control system determines the rear driveshaft rotational speed using the following formula:

$$((r_1+r_2)/2)*r_r$$

wherein $r_1$=the first rear rotational speed, $r_2$=the second rear rotational speed, and $r_r$=a rear axle ratio of the rear driveshaft over the first rear wheel or the second rear wheel.

13. The vehicle system of claim 12, further including:

wheel speed sensors for sensing the speed of the wheels;

wherein the passive torque control system measures the first front rotational speed of the first front wheel, the second front rotational speed of the second front wheel, the first rear rotational speed of the first rear wheel and the second rear rotational speed of the second rear wheel with the speed sensors.

14. The vehicle system of claim 10, further including:

a stability control system communicating with the passive torque control system.

15. The vehicle system of claim 14, wherein:

the passive torque control system requests an output from the transmission equal to the negative torque transfer only in response to activation of the stability control system.

16. The vehicle system of claim 15, further including:

a front axle having a first front wheel and a second front wheel, the front driveshaft being connected to the front axle; and a rear axle having a first rear wheel and a second rear wheel, with the rear driveshaft being connected to the rear axle;

wherein the stability control system includes wheel speed sensors; and wherein the passive torque control system measures the first front rotational speed of the first front wheel, the second front rotational speed of the second front wheel, the first rear rotational speed of the first rear wheel and the second rear rotational speed of the second rear wheel with the speed sensors.

17. The vehicle system of claim 16, wherein:

the passive torque control system determines the front driveshaft rotational speed using the following formula:

$$((f_1+f_2)/2)*r_f$$

wherein $f_1$=the first front rotational speed, $f_2$=the second front rotational speed, and $r_f$=a front axle ratio of the front driveshaft over the first front wheel or the second front wheel; and the passive torque control system determines the rear driveshaft rotational speed using the following formula:

$$((r_1+r_2)/2)*r_r$$

wherein $r_1$=the first rear rotational speed, $r_2$=the second rear rotational speed, and $r_r$=a rear axle ratio of the rear driveshaft over the first rear wheel or the second front wheel.

18. The vehicle system of claim 10, wherein:

the passive coupling is a viscous coupling and the negative torque transfer is a viscous negative torque transfer.

19. A method of overcoming negative viscous torque in a passive viscous coupling in a vehicle having all wheel drive, the vehicle including a front axle having a first front wheel and a second front wheel, a front driveshaft connected to the front axle, a rear axle having a first rear wheel and a second rear wheel, a rear driveshaft connected to the rear axle, the passive viscous coupling connecting the front driveshaft and the rear driveshaft, and a transmission operative connected to the passive coupling, the method comprising:

measuring a first front rotational speed of the first front wheel;

measuring a second front rotational speed of the second front wheel;

measuring a first rear rotational speed of the first rear wheel;

measuring a second rear rotational speed of the second rear wheel;

calculating a front driveshaft rotational speed using the following formula:

$$((f_1+f_2)/2)*r_f$$

wherein $f_1$=the first front rotational speed, $f_2$=the second front rotational speed, and $r_f$=a front axle ratio of the front driveshaft over the first front wheel or the second front wheel;

calculating a rear driveshaft rotational speed using the following formula:

$$((r_1+r_2)/2)*r_r$$

wherein $r_1$=the first rear rotational speed, $r_2$=the second rear rotational speed, and $r_r$=a rear axle ratio of the rear driveshaft over the first rear wheel or the second rear wheel;

calculating a speed difference across the passive viscous coupling by subtracting the front driveshaft rotational speed from the rear driveshaft rotational speed;

determining viscous negative torque transfer in the passive coupling corresponding to the speed difference; and requesting the vehicle to increase transmission output equal to the viscous negative torque transfer.

20. The method of overcoming negative viscous torque of claim 19, further including:

providing the vehicle includes a stability control system; and activating the stability control system;

wherein the step of requesting the vehicle to increase transmission output equal to the negative torque transfer only occurs in response to the step of activating the stability control system.

* * * * *